United States Patent [19]
Kimball

[11] Patent Number: 5,349,269
[45] Date of Patent: Sep. 20, 1994

[54] POWER SUPPLY HAVING DUAL INVERTERS FOR ELECTROLUMINESCENT LAMPS

[75] Inventor: Robert A. Kimball, Scottsdale, Ariz.

[73] Assignee: Durel Corporation, Tempe, Ariz.

[21] Appl. No.: 38,220

[22] Filed: Mar. 29, 1993

[51] Int. Cl.$^5$ .............................. G09G 3/10
[52] U.S. Cl. .................. 315/169.3; 315/160; 315/169.1; 315/174; 315/176; 315/209 R; 315/226
[58] Field of Search .............. 315/160, 169.3, 169.1, 315/174, 176, 209, 226

[56] References Cited
U.S. PATENT DOCUMENTS

| | | | |
|---|---|---|---|
| 4,449,075 | 5/1984 | D'Onofrio et al. | 315/169.3 |
| 4,527,096 | 7/1985 | Kindlmann | 315/169.3 |
| 4,899,086 | 2/1990 | Hirata et al. | 315/169.3 |
| 5,235,253 | 8/1993 | Sato | 315/169.3 |

FOREIGN PATENT DOCUMENTS
0372181 6/1990 European Pat. Off. .

Primary Examiner—Robert J. Pascal
Assistant Examiner—Reginald A. Radliff
Attorney, Agent, or Firm—Cahill, Sutton & Thomas

[57] ABSTRACT

A power supply for an electroluminescent lamp includes a pair of inverters for alternately powering the EL lamp from a low voltage DC source. A first inverter is connected to a first electrode of the EL lamp and a transistor is connected between the first electrode and electrical ground. A second inverter is connected to a second electrode of the EL lamp and a second transistor is connected between the second electrode and electrical ground. A pulse generator connected to the inverters and the transistors operates the inverters and transistors to power the EL lamp alternately from one inverter and then the other. In one embodiment of the invention, the voltage across the EL lamp is referenced to ground and, in another embodiment, the voltage across the EL lamp is referenced to the voltage of the DC source.

16 Claims, 3 Drawing Sheets

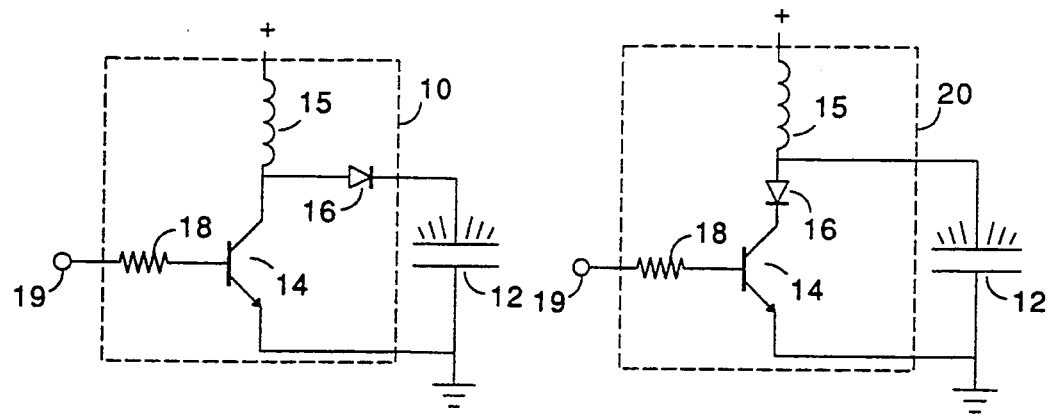
FIG. 1
(Prior Art)
FIG. 2
(Prior Art)
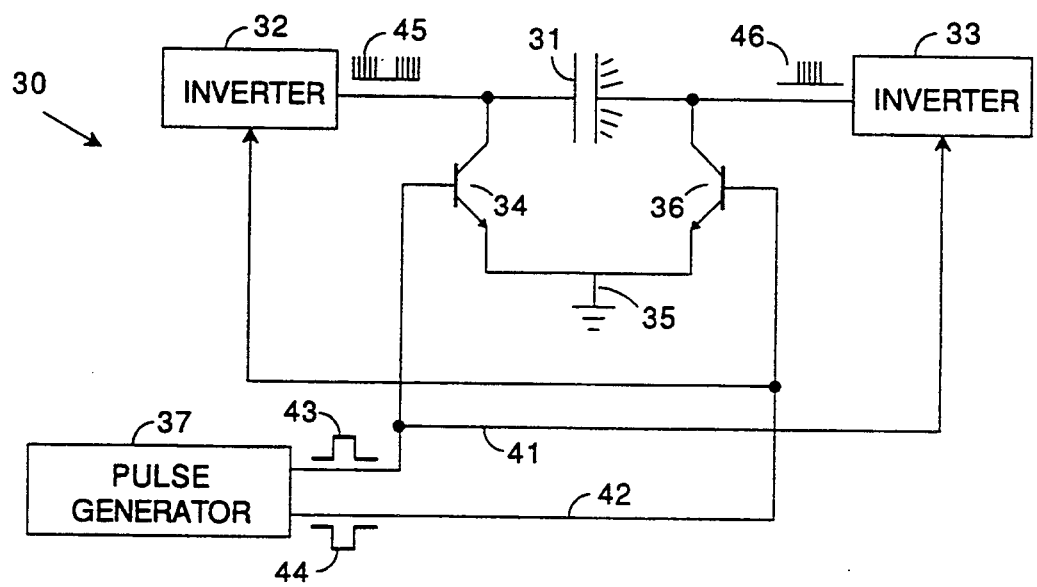
FIG. 3

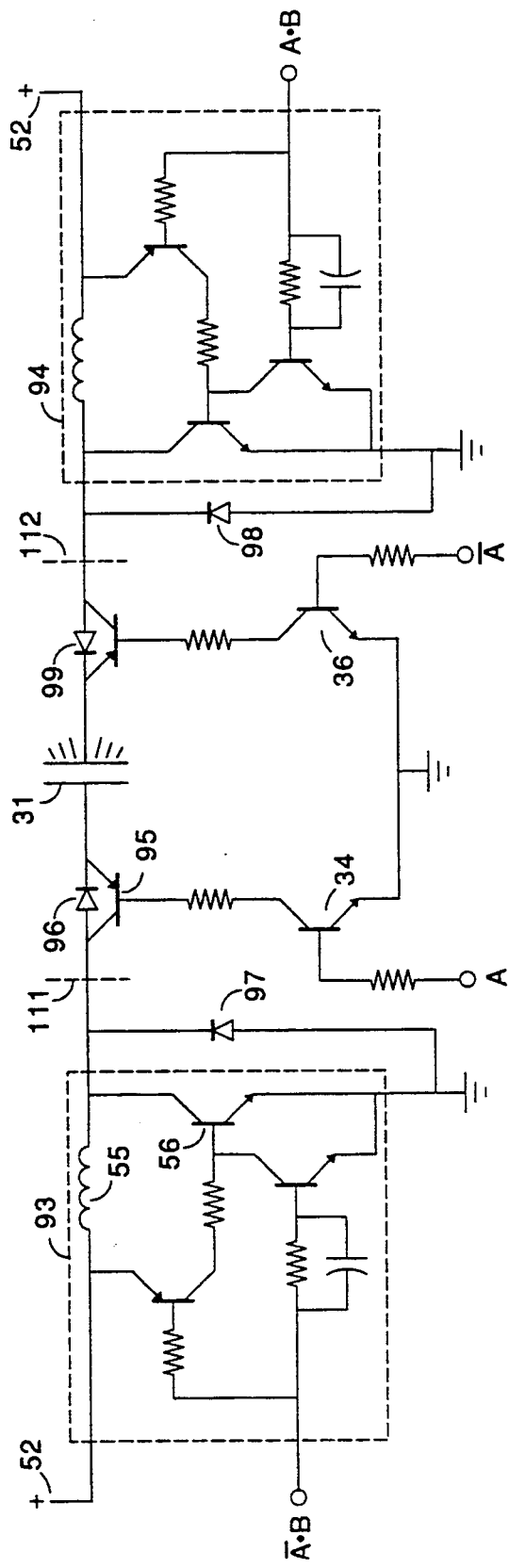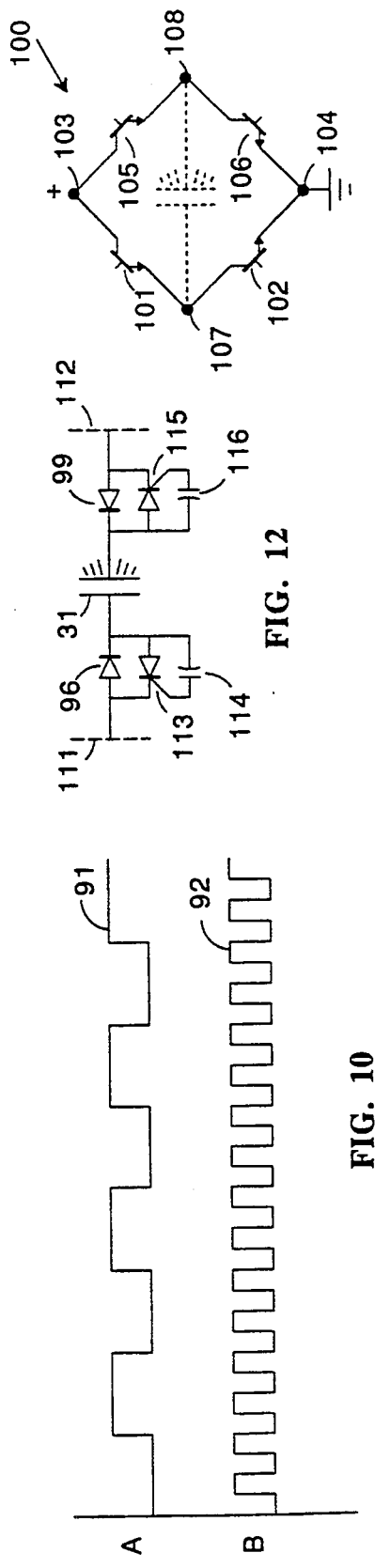
FIG. 11
FIG. 12
FIG. 13 (Prior Art)
FIG. 10

POWER SUPPLY HAVING DUAL INVERTERS FOR ELECTROLUMINESCENT LAMPS

BACKGROUND OF THE INVENTION

This invention relates to an improved power supply for electroluminescent (EL) lamps and, in particular, to a low cost power supply which can be manufactured in integrated circuit form and can be powered by a direct current (DC) source having a voltage of 1–15 volts.

An EL lamp is essentially a capacitor having a dielectric layer including a phosphor powder which glows in the presence of a strong electric field and a very low current. The dielectric layer is held between two electrodes, one of which is transparent. Because the EL lamp is a capacitor, an alternating current (AC) must be applied to cause the phosphor to glow, otherwise the capacitor charges to the applied voltage and the current through the EL lamp ceases.

For wristwatches and other applications such as pocket pagers, an EL lamp is driven by an inverter which converts the direct current from a small battery into alternating current. The battery voltage, typically one to three volts, limits the voltage which can be applied to a lamp by the inverter. In order for the EL lamp to glow sufficiently, a peak-to-peak voltage in excess of one hundred and twenty volts is necessary. Converting from three volts to one hundred and twenty volts is difficult without a transformer and a transformer is too bulky and expensive for a wristwatch and for many other applications.

To increase the voltage across an EL lamp, the prior art teaches connecting the EL lamp across the AC diagonal of a switching bridge and the output from the inverter across the DC diagonal of the bridge. The bridge electrically reverses the connections between the EL lamp and the inverter, reversing the polarity of the applied voltage. The result is an approximate doubling of the voltage across the EL lamp.

A switching bridge of the prior art typically includes four transistors. U.S. Pat. No. 4,527,096—Kindlmann—discloses a bridge circuit including four field effect transistors (FETs). U.S. Pat. No. 4,899,086—Hirata et al.—and European Patent Application 0 372 181 A1—Kamens—disclose a variation in which an SCR is connected in series with a transistor in each half of the bridge. The EL lamp is connected between the junction of the SCR with the transistor in one half of the bridge and the junction of the SCR with the transistor in the other half of the bridge. The European Patent Application also discloses using the gate-anode parasitic capacitance to trigger the SCR when the series transistor is not conducting.

An inverter for EL lamps is typically what is known as a "flyback" inverter in which the energy stored in an inductor is supplied to the EL lamp as a small current at high voltage. FIGS. 1 and 2 are simplified schematic diagrams of flyback inverters in which inverter 10 is a "pumping" inverter and inverter 20 is a "ringing" inverter. The location of diode 16, in part, determines the type of inverter.

Inverter 10 supplies a series of high frequency pulses to lamp 12. A pulse is produced each time transistor 14 turns off, permitting the junction of transistor 14 and series inductor 15 to rise in voltage. Since transistor 14 was conducting, the current through inductor 15 established a field proportional to the current and the inductance of inductor 15. When transistor 14 shuts off, the field collapses at a rate determined by the turn-off characteristics of transistor 14 and the voltage across inductor 15 is proportional to $\delta i / \delta t$. Thus, a low voltage/high current is converted into a high voltage/low current. Each time transistor 14 turns off, the same amount of current is applied to lamp 12 and the voltage on the lamp is pumped by a series of current pulses from the inverter. Diode 16 prevents lamp 12 from discharging through transistor 14.

Inverter 20 operates differently. When transistor 14 shuts off, the energy stored in the field of inductor 15 is applied to lamp 12 until the current through inductor 15 is minimal and the voltage across EL lamp 12 is at a maximum. The current then flows back through inductor 15, increasing the energy stored in the inductor. If there were no losses in the circuit, the process would continue indefinitely, at a frequency determined by the resonant frequency of the inductor and the capacitance of the EL lamp, a phenomenon known as "ringing." Since an AC waveform is being generated, the collector of transistor 14 can go negative relative to the base, drawing leakage current from the battery through the base-collector junction, damping the oscillations. Diode 16 prevents this leakage current. U.S. Pat. No. 4,449,075—D'Onofrio et al.—discloses a ringing inverter.

The frequency of the alternating current through an EL lamp affects the life of the EL lamp, with frequencies below 1,000 hz. being preferred. Too low of a frequency causes a noticeable flicker. Thus, a frequency of 100–1,000 hz. is preferred. Since inductor 15 and lamp 12 form a series resonant circuit, a large inductor is required for resonance at low frequencies. To overcome this problem, a high frequency (10–100 khz.) pulse train is combined with a low frequency pulse train and applied to terminal 19. By using bursts of high frequency pulses, inductor 15 can be made significantly smaller. If a switching bridge is used, the low frequency pulses are applied to the control electrodes of the devices in the bridge.

Stability is a problem in power supplies having a switching bridge, particularly bridges having SCRs. The high frequency, high voltage pulses are coupled to a control electrode of a semiconductor device by the parasitic capacitance inherent in the device, causing erratic triggering. Occasionally, an EL lamp is discharged when it is supposed to be charged and vice-versa. Stability becomes more of a problem as the input voltage to the bridge is increased.

Another problem with power supplies of the prior art is a DC component in the high voltage on the EL lamp. A DC component can cause cathodic reaction in the EL lamp as components of the dielectric layer migrate to one or the other electrode. In FIGS. 1 and 2, the battery is always connected to the EL lamp through inductor 15, causing a DC component equal to the voltage of the DC source voltage. Interposing a switching bridge between the EL lamp and the inverter eliminates the DC component but introduces the stability problem described above.

Another problem with power supplies of the prior art is the forward voltage drop across semiconductor junctions. Each PN junction in a silicon semiconductor device has a forward voltage drop of approximately 0.6 volt. The voltage drop across a saturated transistor can be as low as 0.2 volts. If the inverter of FIG. 1 were used in a watch having a 1.5 volt battery, the maximum voltage across the inductor when transistor 14 is conducting is 1.3 volts. In FIG. 2, the maximum voltage across the inductor is 0.7 volts when transistor 14 is conducting. This limits the high voltage that can be produced. The only way to increase the output voltage is to increase the current through the inductor, putting a severe load on the battery in the watch.

On the high voltage side of the circuit, i.e. the connection to the EL lamp, the problem is not as severe but the forward voltage drop limits the power applied to the EL lamp, particularly if a switching bridge is added. A bridge typically adds a minimum of four junctions in series with the EL lamp.

In view of the foregoing, it is therefore an object of the invention to provide a power supply for operating EL lamps from a DC source having a voltage of 1-15 volts.

Another object of the invention is to provide a power supply which can generate a high voltage across an EL lamp without using a switching bridge.

A further object of the invention is to provide a stable high voltage power supply for EL lamps.

Another object of the invention is to eliminate a DC component through an EL lamp without using a switching bridge in the power supply.

A further object of the invention is to provide a more efficient power supply for an EL lamp.

SUMMARY OF THE INVENTION

The foregoing objects are achieved in the invention, in which a pair of inverters alternately power an EL lamp. A first inverter is connected to a first electrode of the EL lamp and a second inverter is connected to a second electrode of the EL lamp. A pulse generator connected to the inverters operates the inverters to power the EL lamp alternately from one inverter and then the other. As a first inverter turns on and the second inverter turns off, a portion of the energy stored in the capacitance of the EL lamp is coupled to the second inverter for use during the next half cycle when the second inverter is turned on, conserving energy in the power supply.

BRIEF DESCRIPTION OF THE DRAWINGS

A more complete understanding of the invention can be obtained by considering the following detailed description in conjunction with the accompanying drawings, in which:

FIG. 1 is a simplified schematic diagram of a pumping inverter of the prior art;

FIG. 2 is a simplified schematic diagram of a ringing inverter of the prior art;

FIG. 3 is a partial block diagram of a power supply constructed in accordance with the invention;

FIG. 10 illustrates the low frequency and high frequency pulse trains for controlling the inverters in accordance with the invention;

FIG. 11 is a schematic diagram of a power supply constructed in accordance with the invention;

FIG. 12 is a partial schematic diagram of a power supply constructed in accordance with a preferred embodiment of the invention; and FIG. 13 is a schematic diagram of a switching bridge of the prior art.

DETAILED DESCRIPTION OF THE INVENTION

Figure 4:
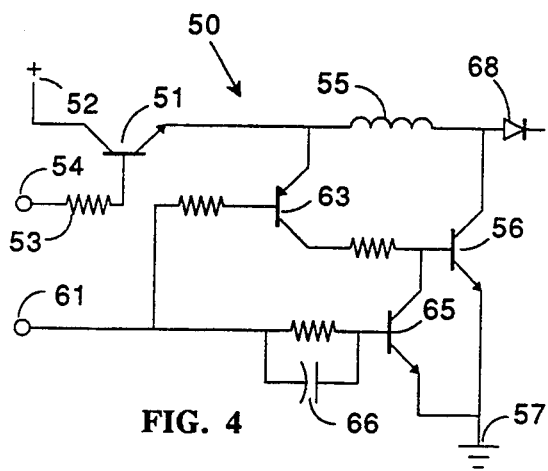
FIG. 4 is a schematic diagram of a pumping inverter constructed in accordance with the invention.

In FIG. 3, EL lamp 31 has one electrode connected to the output of inverter 32 and a second electrode connected to the output of inverter 33. Switching transistor 34 is connected between the output of inverter 32 and electrical ground 35 and switching transistor 36 is connected between the output of inverter 33 and electrical ground 35. Pulse generator 37 has output 41 connected to inverter 33 and to the base or control input of transistor 34. Output 42 of pulse generator 37 is connected to inverter 32 and the base or control input of transistor 36. The pulses on outputs 41 and 42 are complementary low frequency pulses as indicated by pulse trains 43 and 44; i.e. pulse train 44 is the logical inverse of pulse train 43.

Inverters 32 and 33 do not operate simultaneously. Instead, under the control of the signals from pulse generator 37, EL lamp 31 is alternately powdered by the two inverters. Specifically, inverter 32 is turned on and transistor 36 is conductive when output 42 is high and inverter 32 is turned off and transistor 36 is non-conducting when output 42 is low. Similarly, inverter 33 is turned on and transistor 34 is conductive when output 41 is high and inverter 33 is turned off and transistor 34 is non-conducting when output 41 is low. Since the signal on output 42 is the inverted signal on output 41, the inverters alternately power EL lamp 31.

The output of inverters 32 and 33 is a high voltage, high frequency pulse train, as indicated by waveforms 45 and 46. With transistor 36 conducting, the right-hand electrode of EL lamp 31 is grounded. The high voltage pulses from inverter 32 incrementally charge the left-hand electrode of lamp 31 positive relative to the right-hand electrode. When transistor 36 turns off and transistor 34 turns on, the left-hand electrode is still positive relative to the right-hand electrode, but is now grounded. Thus, the right-hand electrode is negative with respect to ground.

The high voltage pulses from inverter 33 incrementally charge the right-hand electrode positively and the right-hand electrode proceeds from a negative voltage through zero voltage to a positive voltage. Transistor 34 and inverter 33 are then turned off and transistor 36 and inverter 32 are turned on, repeating the cycle. The current through lamp 31 is an alternating current having the same frequency as the pulses applied to the bases of transistors 34 and 36.

Depending upon the application for the power supply, inverters 32 and 33 can be any type of inverter for supplying a high voltage to lamp 31. The output voltage from one inverter alone need not be high enough to drive an EL lamp since the outputs of the inverters are combined oppositely, effectively doubling the output voltage. The maximum output voltage of each inverter is limited only by the voltage rating of the EL lamp, typically 400 volts peak to peak. Each inverter should produce an output voltage no greater than one half the maximum rating of the EL lamp to which it is connected.

FIG. 4 is a schematic diagram of a pumping inverter which can be used for inverters 32 and 33. In FIG. 4, transistor 51 is a pass transistor having its collector connected to the low voltage terminal of a source of DC, represented by plus sign 52. The base of transistor 51 is connected through current limiting resistor 53 to input terminal 54. The emitter of transistor 51 is connected to one terminal of inductor 55. The other terminal of inductor 55 is connected through transistor 56 to electrical ground 57.

Transistor 51, inductor 55, and transistor 56 form the high current, low voltage path in inverter 50. Transistor 51 acts as an on/off switch, i.e. logic "high" (a voltage of approximately the same magnitude as source 52) on input terminal 54 turns transistor 51 on, connecting DC source 52 to the remainder of the circuit.

A logic "low" (approximately ground potential) on control input 61 turns on transistor 63 and turns off transistor 65. Transistor 63 provides an amplified base current to transistor 56, turning on transistor 56 more quickly. A logic high on control input 61 turns off transistor 63 and turns on transistor 65. When conducting, transistor 65 drains charge stored in the parasitic capacitance of the base-emitter junction of transistor 56, causing transistor 56 to turn off more quickly. Capacitor 66 acts as a differentiator, providing a larger amplitude pulse to transistor 65 to increase the switching speed of transistor 65.

Input terminal 54 receives a low frequency pulse train, e.g. from output 42 (FIG. 3). Control input 61 receives a combined low frequency pulse train and a high frequency pulse train for producing a burst of high frequency pulses, e.g. as illustrated by waveform 45 (FIG. 3). Diode 68 couples the high voltage, high frequency pulses to an EL lamp (not shown in FIG. 4) and prevents current flowing from the EL lamp into inverter 50 when the collector voltage of transistor 56 is less than the voltage on the EL lamp.

Inductor 55 and diode 68 are the high voltage, low current path in inverter 50. Transistor 51, inductor 55, and transistor 56 are the low voltage, high current path in inverter 50. Transistor 51 prevents a DC component from appearing in the output of inverter 50 by blocking power to the circuit when the circuit is not pumping. With transistor 51 and transistor 56, there are two forward biased PN junctions in the high current path and inverter 50 is not suitable for driving a watch display from a 1.5 volt watch battery because of excessive drain on the battery to provide sufficient high voltage. A 3.0 volt watch battery is preferred for inverter 50. For applications having a higher current DC source, the circuit can be driven from a 1.5 volt DC source.

Figure 5:
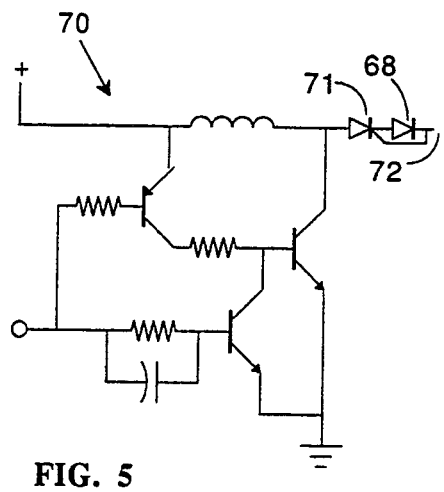
FIG. 5 is a schematic diagram of a pumping inverter having a series SCR on the output thereof.

FIG. 5 illustrates an embodiment of the invention in which an SCR in the high voltage path eliminates any DC component. In FIG. 5, SCR 71 is series connected with diode 68 and the gate electrode of SCR 71 is connected to the cathode of diode 68. In inverter 70, diode 68 serves a different function from that for inverter 50. Typically an SCR will not turn off very quickly. Diode 68 is a fast switching diode which turns off quickly and, because the diode is connected between the gate and the cathode of the SCR, assures that the gate of the SCR is negatively biased with respect to the cathode by at least one forward voltage drop to further assure that the SCR will turn off. SCR 71 is turned on by high voltage pulses coupled to the gate electrode by parasitic capacitance.

SCR 71 isolates inverter 70 from output 72 when inverter 70 is turned off, blocking a DC component from output 72 and reducing battery drain when output 72 is grounded.

Figure 6:
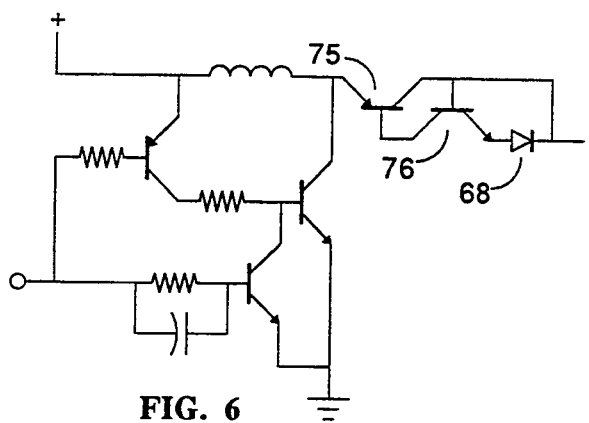
FIG. 6 is a schematic diagram of a pumping inverter having complementary transistor pair connected a series SCR on the output thereof.

FIG. 6 illustrates an alternative embodiment of the invention in which an SCR in the high voltage path is replaced with a complementary transistor pair connected in SCR configuration. The collector of PNP transistor 75 is connected to the base of NPN transistor 76 and the collector of NPN transistor 76 is connected to the base of PNP transistor 75. The base of transistor 76 is the "gate" of the complementary pair and is connected to the cathode of diode 68.

The complementary pair operate as an SCR except that parasitic capacitances are greater in the complementary pair than in most SCRs, which are designed with minimal parasitic capacitance. The increased parasitic capacitance permits better coupling of the high voltage pulses to the base of transistor 76 and better switching.

Figure 7:
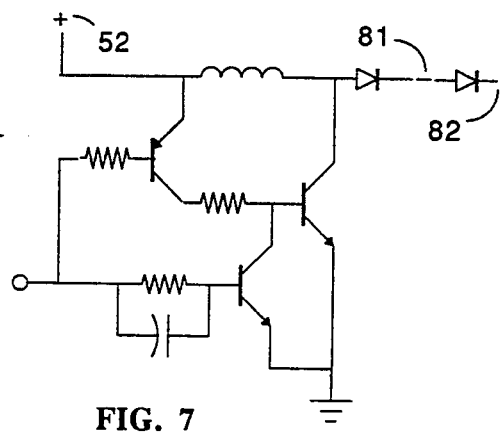
FIG. 7 is a schematic diagram of a pumping inverter having a series diode stack on the output thereof.

FIG. 7 illustrates an alternative embodiment of the invention in which diode stack 81 in the high voltage path blocks any DC component from output 82. Diode stack 81 has a combined forward voltage drop in excess of DC source voltage 52. For example, if a 3.0 volt source were used, then five diodes are used in the stack. Thus, when output 82 is grounded, the combined forward voltage drops of the diodes is greater than the source voltage and the diodes remain non-conducting, preventing battery drain.

Figure 8:
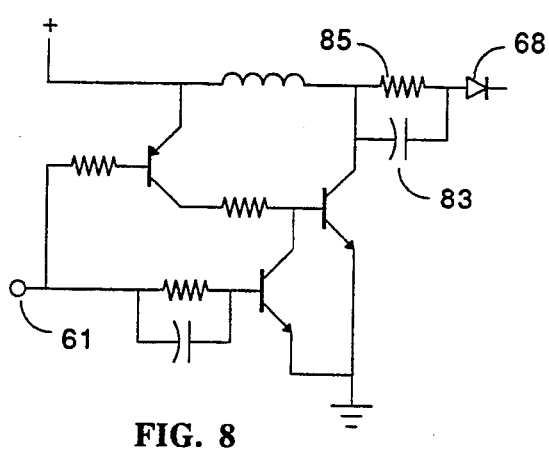
FIG. 8 is a schematic diagram of a pumping inverter having a bypassed coupling capacitor on the output thereof.

FIG. 8 illustrates an alternative embodiment of the invention in which coupling capacitor 83 in the high voltage path blocks any DC component from output 84. When output 84 is grounded, no direct current can flow through capacitor 84. Resistor 85 slowly bleeds off the charge accumulated on capacitor 83 from the pulses applied to control input 61. The time constant of resistor 85 and capacitor 83 is approximately equal to the period of the low frequency pulses.

Figure 9:
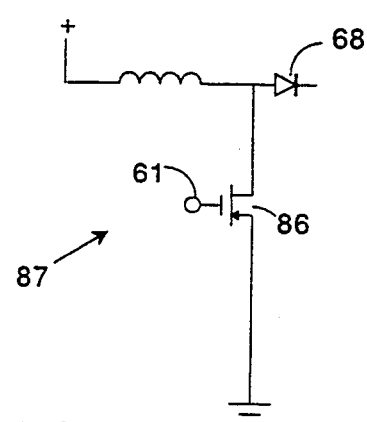
FIG. 9 is a schematic diagram of a pumping inverter using a field effect transistor.

FIG. 9 illustrates an alternative embodiment of the invention in which field effect transistor (PET) 86 is used instead of bipolar transistors 56, 63, and 65. The operation of inverter 87 is the same as the pump inverters of FIGS. 4–8. Although output diode 68 is illustrated in FIG. 9, the output circuits of PIGS. 5–8 can be used instead.

FIG. 10 illustrates the low frequency and high frequency pulse trains for controlling the inverters in accordance with the invention. Waveform 91 is a low frequency pulse train having a frequency of 100–1,000 hz and duty cycle of fifty percent. Waveform 92 is a high frequency pulse train having a frequency of 10–100 khz and a duty cycle of ten to fifty percent.

FIG. 11 is a schematic diagram of a preferred embodiment of the invention in which waveform 91, designated "A", and waveform 92, designated "B", are applied to the control inputs of two inverters to cause the inverters to alternately power EL lamp 31. In the power supply shown in FIG. 11, a substantial amount of unused energy is coupled back into the inductor and the DC source, conserving energy and significantly reducing the current drawn by the power supply.

In FIG. 11, switching transistor 34 is not connected directly to the output of inverter 93 but is coupled to the output through by-pass transistor 95 connected in parallel with output diode 96. Clamping diode 97 is connected between the output terminal of inverter 93 and ground.

The control input to inverter 93 receives the combined pulses Ā·B, read as "NOT A AND B". This signal is easily produced by pulse generators known in the art in which pulse train A is logically inverted, producing Ā which is combined with pulse train B in an AND circuit. The Ā signal is applied to the base of transistor 36. Since the Ā signal is applied to inverter 93 and transistor 36, inverter 93 supplies power to lamp 31 during alternate half cycles of waveform 91, when A is at a logic low.

The control input to inverter 94 receives the combined pulses A·B, read as "A AND B". This signal is produced by combining pulse train A with pulse train B in an AND circuit. The A signal is also applied to the base of transistor 37. Since the A signal is applied to inverter 94 and transistor 37, inverter 94 supplies power to lamp 31 during the half cycles of waveform 91 when A is at a logic high. The two inverters provide an alternating current through EL lamp 31 as each inverter alternately charges the capacitance of the EL lamp.

At the end of each half cycle of waveform 91, the voltage across EL lamp 31 is at a maximum ($V_{max}$). Assuming that the left-hand electrode of EL lamp 31 is positively charged when A goes high (Ā goes low), then transistors 56 and 36 become non-conducting and transistor 34 becomes conducting. The base or control electrode of transistor 95 is grounded through transistor 34 and the emitter-collector current path of transistor 95 conducts a pulse from EL lamp 31 to inductor 55, charging the inductor.

Additional energy goes to the DC source through clamping diode 98. Assuming that the left-hand electrode of EL lamp 31 is positively charged, then the right-hand electrode is negative with respect to the left-hand electrode. Since transistor 95 connects the left-hand electrode to DC source 52 through inductor 55, the right-hand electrode is forced negative and diodes 98 and 99 are forward biased, conducting charge back to the DC source. Inverter 94 provides high voltage pulses to EL lamp 31 until the end of the half cycle of waveform 91 and then the process is reversed.

The power supply of FIG. 11 provides a substantial energy savings. In one embodiment, the current drawn from a three volt power supply was reduced by fifty percent compared to the current drawn using the circuit shown in FIG. 3. In addition to stability and other advantages of the invention, the circuit of FIG. 11 provides the energy conservation of a ringing circuit without requiring a large inductor to obtain a suitably low frequency.

FIG. 12 is a partial schematic of an alternative embodiment of the power supply shown in FIG. 11. The circuitry shown between dashed lines 111 and 112 in FIG. 12 is substituted for the circuitry shown between dashed lines 111 and 112 in FIG. 11; i.e. the switching transistors and the by-pass transistors are eliminated and an SCR is connected in parallel with each output diode.

SCR 113 is connected in parallel with diode 96 and is oppositely poled to diode 96, a configuration also referred to as being connected "anti-parallel." The anode of diode 96 is connected to the output of inverter 93 and the anode of diode 99 is connected to the output of inverter 94. Capacitor 114 is connected between the anode and the gate of SCR 113 for coupling high voltage pulses from inverter 94 to the gate to turn on the SCR. SCR 115 is connected anti-parallel with diode 99 and capacitor 116 is connected between the anode and the gate of SCR 115. The SCRs are auto-triggering and the capacitors enhance this capability. A complementary transistor pair can be substituted for each SCR.

A power supply incorporating the circuitry of FIG. 12 operates differently from a power supply constructed as shown in FIG. 11. In FIG. 11, the transition at the end of each half cycle of waveform 91 produced a discharge of EL lamp 31 which was coupled back to DC source 52, one pulse each half cycle of waveform 91. In FIG. 12, each high frequency pulse (waveform 92) is coupled to DC source 52 by either SCR 113 or SCR 115.

For example, referring to FIGS. 11 and 12, if the left-hand electrode of EL lamp 31 is positively charged and the half cycle in which A is low is ending, then during the next half cycle inverter 94 produces a series of pulses which are coupled through lamp 31 to the gate of SCR 113. SCR 113 conducts, coupling the left-hand electrode of EL lamp 31 to DC source 52 through inductor 55. The right-hand electrode of EL lamp 31 is now negative with respect to ground, forward biasing diodes 98 and 99 and completing the circuit through the DC source. After EL lamp 31 discharges, subsequent high voltage pulses from inverter 94 turn off diode 98 and pass through EL lamp 31 and inductor 55 to DC source 52.

The voltage across EL lamp 31 is referenced to ground in the circuit shown in FIG. 3. Since the voltage across EL lamp 31 is referenced to the DC source voltage in the circuits of FIGS. 11 and 12, there is no DC component through the EL lamp. In the power supply illustrated in FIG. 12, the current drain caused by transistors 34 and 36 is eliminated. Auto-triggering SCRs are used but do not cause the erratic triggering that can be caused in a switching bridge. Each SCR is supposed to fire when a pulse is coupled the gate electrode and the SCR is forward biased. SCRs are inherently stable when reverse biased and no false triggering occurs.

FIG. 13 is a schematic diagram of a switch bridge circuit of the prior art in which two bipolar transistors are connected in series in each half of the bridge. In bridge 100, transistors 101 and 102 are series connected between DC terminals 103 and 104. Transistors 103 and 104 are also connected between DC terminals 103 and 104. Terminals 103 and 104 are referred to as DC terminals since terminal 103 must be positive with respect to terminal 104 in order for current to flow from terminal 103 to terminal 104 when transistors 101/105 and 102/106 are conducting. Terminals 107 and 108 are AC terminals since current can flow in either direction through a device connected between these terminals.

In the prior art, an EL lamp is connected to the AC terminals of bridge 100 and the output from an inverter is connected to the DC terminals. In operation, either transistors 101 and 106 are conducting or transistors 102 and 105 are conducting, as controlled by suitable low frequency signals connected to the bases of the transistors. The effect is to electrically reverse the connections of the EL lamp to the inverter at a low frequency.

In contrast to the prior art, the connections to the EL lamp are not reversed in the invention. The terminals of the EL lamp are continuously connected to the inverters and to transistors 34 and 36. Thus, one is not using a switching bridge in the power supply of the invention. By eliminating the switch bridge, one eliminates the instability inherent is such circuits. The inverters are separately controlled, preventing false triggering. In addition, the several forward voltage drops of bridge circuits are eliminated from the high voltage path. A DC component is eliminated by the switching circuitry of the invention and by the several different embodiments of cut-off circuitry described. By eliminating the DC component, power consumption is reduced. The power supply of the invention can operate from a voltage as low as one volt and as high as determined by the voltage ratings of the components used in the circuit. The choice of components is not critical and the power supply can be manufactured as an integrated circuit. In one embodiment of the invention, capacitor 66 had a value of 100 pf and capacitor 83 had a value of ten times the capacitance of the EL lamp, or approximately 30 nf for typical backlit displays in pagers. Capacitors 114 and 116 had a value of 10 pf. These values are by way of example only.

Having thus described the invention, it will be apparent to those of skill in the art that various modifications can be made within the scope of the invention. For example, PETs can be used to implement the invention rather than bipolar transistors. The polarities can be reversed for the voltages and transistors (PNP for NPN and vice-versa). While the pulse generator is shown in PIG. 3 as having two outputs, a single output and an inverter can be used instead. The single output is connected directly to inverter 33 and transistor 34 and is connected to inverter 35 and transistor 36 through the inverter.

I claim:

1. A power supply for driving an electroluminescent lamp from a direct current source having a low voltage, said electroluminescent lamp having a first terminal and a second terminal, said power supply comprising:
    a first inverter producing high voltage, high frequency pulses from direct current, said first inverter having
        (i) an input terminal for connection to said direct current source;
        (ii) an output terminal for connection to said first terminal of said electroluminescent lamp,
        (iii) a control input for enabling said first inverter to produce said high voltage, high frequency pulses in response to an enabling pulse on said control input;
    a second inverter producing high voltage, high frequency pulses from direct current, said second inverter having
        (i) an input terminal for connection to said direct current source;
        (ii) an output terminal for connection to said first terminal of said electroluminescent lamp,
        (iii) a control input for enabling said second inverter to produce high voltage, high frequency pulses from said direct current in response to an enabling pulse on said control input;
    a pulse generator
        (i) having a first output connected to the control input of said first inverter,
        (ii) having a second output connected to the control input of said second inverter, and
        (iii) producing enabling pulses on said first and second outputs for causing said first and second inverters to alternately apply high voltage, high frequency pulses to said electroluminescent lamp.

2. The power supply as set forth in claim 1 and further comprising:
    a first switch coupled between said output terminal of said first inverter and an electrical ground, said first switch having a control input;
    a second switch coupled between said output terminal of said second inverter and said electrical ground, said second switch having a control input;
    wherein
        (i) said first output of said pulse generator is connected to the control input of said second switch,
        (ii) said second output of said pulse generator is connected to the control input of said first switch, and
        (iii) said enabling pulses render said first and second switches alternately conducting.

3. The power supply as set forth in claim 2 and further comprising:
    a first diode connected to said output terminal of said first inverter;
    a second diode connected to said output terminal of said second inverter;
    a first by-pass transistor connected in parallel with said first diode, wherein
        (i) said first by-pass transistor includes a control electrode;
        (ii) said first switch is connected between said control electrode and ground; and
        (iii) said first by-pass transistor controls the transfer of energy from said lamp to said first inverter;
    a second by-pass transistor connected in parallel with said second diode, wherein
        (i) said second by-pass transistor includes a control electrode;
        (ii) said second switch is connected between said control electrode and ground; and
        (iii) said second by-pass transistor controls the transfer of energy from said lamp to said second inverter.

4. The power supply as set forth in claim 1 and further comprising:
    a first diode connected to said output terminal of said first inverter;
    a second diode connected to said output terminal of said second inverter;
    a first SCR connected anti-parallel with said first diode;
    a second SCR connected anti-parallel with said second diode;
    a first clamping diode connected between said output terminal of said first inverter and an electrical ground;
    a second clamping diode connected between said output terminal of said second inverter and said electrical ground.

5. The power supply as set forth in claim 4 wherein said first and second SCRs each comprise a complementary transistor pair connected in SCR configuration.

6. The power supply as set forth in claim 4 wherein said first and second SCRs each include an anode, a gate and a cathode and said power supply further comprises:
    a first capacitor connected between the anode and gate of said first SCR for enhancing auto-triggering of said first SCR; and
    a second capacitor connected between the anode and gate of said second SCR for enhancing auto-triggering of said second SCR.

7. The power supply as set forth in claim 1 and further comprising:

a first SCR device connected to said output terminal of said first inverter; and a second SCR device connected to said output terminal of said second inverter.

8. The power supply as set forth in claim 7 wherein said first SCR device includes a first complementary pair of transistors connected in SCR configuration and said second SCR device includes a second complementary pair of transistors connected in SCR configuration.

9. A power supply for driving an electrical device requiring alternating current from a direct current source, said direct current source having a low voltage, said electrical device having a first terminal and a second terminal, said power supply comprising:

a first inverter for converting said low voltage to a high voltage, said first inverter having an output terminal for connection to said first terminal of said electrical device and a control terminal for receiving a control signal to enable or disable said first inverter;

a second inverter for converting said low voltage to a high voltage, said second inverter having an output terminal for connection to said second terminal of said electrical device and a control terminal for receiving a control signal to enable or disable said second inverter; and a pulse generator having a first output terminal and a second output terminal, said pulse generator producing control signals in the form of first pulses at said first output terminal and second pulses at said second output terminal, wherein (i) said first pulses and said second pulses have the same frequency and said second pulses are the inverse of said first pulses;

(ii) the first output of said pulse generator is connected to the control terminal of said first inverter;

(iii) the second output of said pulse generator is connected to the control terminal of said second inverter; and (iv) said pulse generator causes said first and second inverters to alternately power said electrical device.

10. The power supply as set forth in claim 9 wherein said high voltage from each inverter alone is insufficient to power said electrical device.

11. The power supply as set forth in claim 9 wherein (i) said first inverter includes a flyback circuit having an inductor coupled to said output terminal of said first inverter; and (ii) said second inverter includes a flyback circuit having an inductor coupled to said output terminal of said second inverter.

12. A method for powering an electroluminescent lamp from a direct current source having an electrical ground and a low voltage terminal, said electroluminescent lamp having a first terminal and a second terminal, said method comprising the steps of:

connecting to said first terminal a first inverter for converting said direct current into a first train of high voltage pulses;

connecting to said second terminal a second inverter for converting said direct current into a second train of high voltage pulses; and non-simultaneously supplying said first train of high voltage pulses to said first terminal and said second train of high voltage pulses to said second terminal.

13. The method as set forth in claim 12 and further comprising the step of:

referencing said first and second trains of high voltage pulses to ground.

14. The method as set forth in claim 13 wherein said referencing step comprises the steps coupling said second terminal to said electrical ground when supplying said first train of high voltage pulses to said first terminal; and coupling said first terminal to said electrical ground when supplying said second train of high voltage pulses to said second terminal.

15. The method as set forth in claim 12 and further comprising the step of:

referencing said first and second trains of high voltage pulses to said low voltage.

16. The method as set forth in claim 13 wherein said referencing step comprises the steps of:

coupling said second terminal to said low voltage terminal when supplying said first train of high voltage pulses to said first terminal; and coupling said first terminal to said low voltage terminal when supplying said second train of high voltage pulses to said second terminal.

* * * * *